(12) United States Patent
Miyauchi et al.

(10) Patent No.: US 10,105,753 B2
(45) Date of Patent: Oct. 23, 2018

(54) OPENING/CLOSING APPARATUS AND MOLDING APPARATUS

(71) Applicant: Toshiba Kikai Kabushiki Kaisha, Tokyo-to (JP)

(72) Inventors: Takaki Miyauchi, Numazu (JP); Jun Koike, Numazu (JP); Hideaki Kitta, Numazu (JP); Hiroyuki Onuma, Numazu (JP); Masato Kinoshita, Numazu (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 0 days.

(21) Appl. No.: 15/522,620

(22) PCT Filed: Oct. 26, 2015

(86) PCT No.: PCT/JP2015/080115
§ 371 (c)(1),
(2) Date: Apr. 27, 2017

(87) PCT Pub. No.: WO2016/068077
PCT Pub. Date: May 6, 2016

(65) Prior Publication Data
US 2017/0333984 A1   Nov. 23, 2017

(30) Foreign Application Priority Data

May 19, 2015   (JP) ................................. 2015-101958

(51) Int. Cl.
*B29C 45/64*   (2006.01)
*B22D 17/26*   (2006.01)
(Continued)

(52) U.S. Cl.
CPC .............. *B22D 17/26* (2013.01); *B29C 44/00* (2013.01); *B29C 44/58* (2013.01); *B29C 45/68* (2013.01);
(Continued)

(58) Field of Classification Search
CPC .... B29C 45/661; B29C 45/681; B29C 45/683
See application file for complete search history.

(56) References Cited

U.S. PATENT DOCUMENTS 3,452,399 A * 7/1969 Blumer ................. B29C 45/681
100/272
4,088,432 A * 5/1978 Farrell .................. B29C 45/681
425/150

(Continued)

FOREIGN PATENT DOCUMENTS

JP   02-290662   11/1990
JP   07-088918   4/1995
(Continued)

OTHER PUBLICATIONS

International Search Report (with English Translation) issued in PCT/JP2015/080115 dated Jan. 12, 2016.
(Continued)

*Primary Examiner* — James P Mackey
(74) *Attorney, Agent, or Firm* — DLA Piper LLP US

(57) ABSTRACT

An opening/closing apparatus is provided for use in a molding apparatus, such as an injection molding machine. The opening/closing apparatus may eliminate the influence of a slight gap formed between a bush and a pin in a link connecting portion of a toggle link mechanism and in addition, can enhance workability e.g., in mold replacement. An opening/closing apparatus of the present technology may include an opening/closing mechanism including a toggle link mechanism connecting a pressure-receiving platen and
(Continued)

a movable platen; a drive mechanism for driving the opening/closing mechanism; and a core-back hydraulic cylinder for applying a load to the movable platen in a given direction in conjunction with the first drive mechanism, configured to perform the operation of slightly opening of the mold.

16 Claims, 9 Drawing Sheets

(51) Int. Cl.
  *B29C 45/68* (2006.01)
  *B29C 44/00* (2006.01)
  *B29C 44/58* (2006.01)
  *B29C 45/66* (2006.01)
(52) U.S. Cl.
  CPC .......... *B29C 45/681* (2013.01); *B29C 45/661* (2013.01); *B29C 45/683* (2013.01)

(56) References Cited

U.S. PATENT DOCUMENTS

| | | | | |
|---|---|---|---|---|
| 4,273,524 | A * | 6/1981 | Smith | B29C 45/6707 425/450.1 |
| 6,440,351 | B1 * | 8/2002 | Saito | B29C 45/561 264/328.11 |
| 8,097,192 | B2 * | 1/2012 | Tsuda | B29C 44/428 264/40.1 |
| 9,682,508 | B2 * | 6/2017 | Okamoto | B29C 45/80 |
| 2005/0109229 | A1 | 5/2005 | Hasegawa | |

FOREIGN PATENT DOCUMENTS

| | | |
|---|---|---|
| JP | 2003-305759 | 10/2003 |
| JP | 2004-314492 | 11/2004 |
| JP | 2006-334793 | 12/2006 |
| JP | 2008-110498 | 5/2008 |
| JP | 2011-031535 | 2/2011 |
| JP | 2014-108613 | 6/2014 |
| WO | WO 2004/026552 | 4/2004 |

OTHER PUBLICATIONS

Written Opinion (with English Translation) issued in PCT/JP2015/080115 dated Jan. 12, 2016.
English Language Abstract of JP 2014-108613 published Jun. 12, 2014.
English Language Abstract of JP 07-088918 published Apr. 4, 1995.
English Language Abstract of JP 2006-334793 published Dec. 14, 2006.
English Language Abstract of JP 02-290662 published Nov. 30, 1990.
English Language Abstract of JP 2003-305759 published Oct. 28, 2003.
English Language Abstract of JP 2004-314492 published Nov. 11, 2004.
English Language Abstract of JP 2011-031535 published Feb. 17, 2011.
English Language Abstract of JP 2008-110498 published May 15, 2008.

* cited by examiner

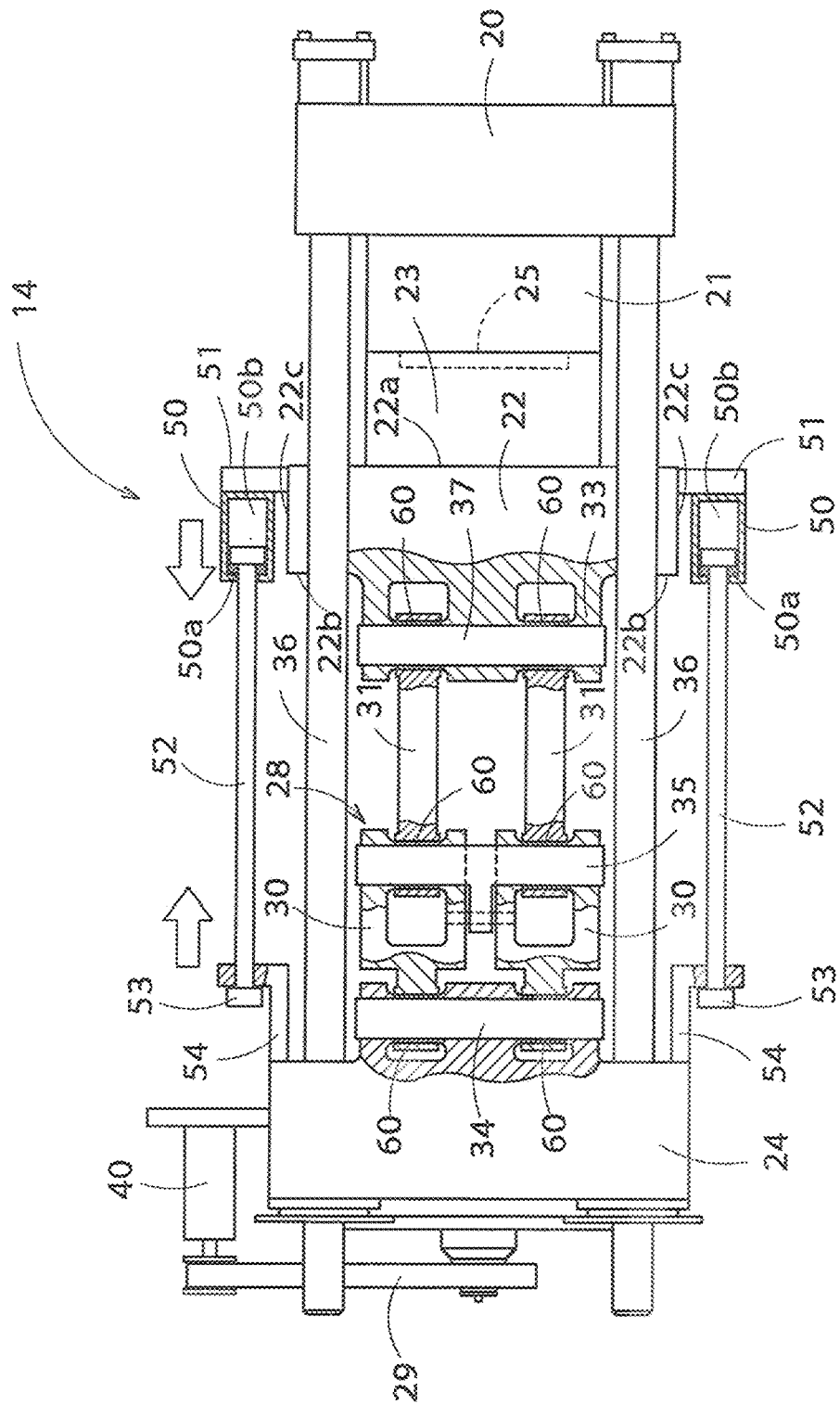

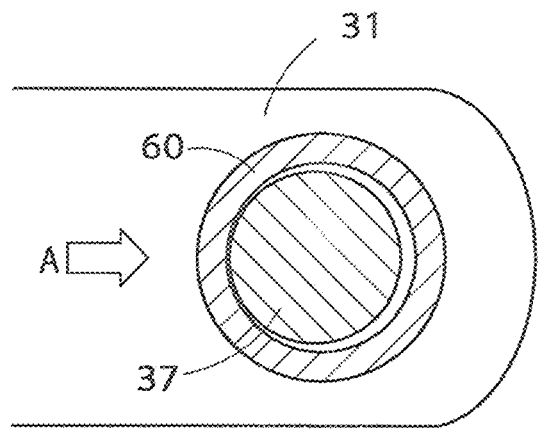
FIG.5(a) UPON CLAMPING OF THE MOLD
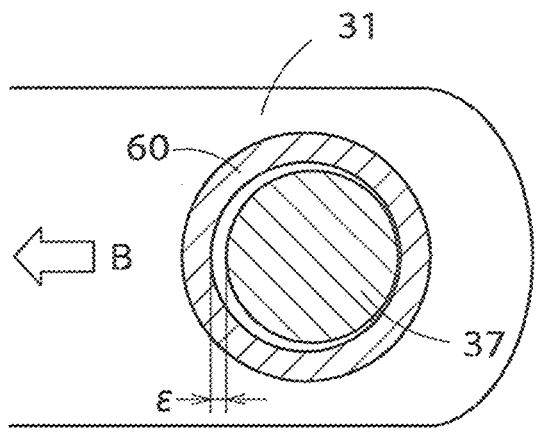
FIG.5(b) UPON CORE-BACK OPERATION

UPON CLAMPING OF THE MOLD

IMMEDIATELY BEFORE THE START OF CORE-BACK OPERATION

UPON CORE-BACK OPERATION

OPENING/CLOSING APPARATUS AND MOLDING APPARATUS

CROSS REFERENCE TO RELATED APPLICATIONS

This application is a U.S. National Stage Application of International Application No. PCT/JP2015/080115 filed Oct. 26, 2015, which claims priority from Japanese Patent Application No. 2014-219291 filed Oct. 28, 2014 and Japanese Patent Application No. 2015-101958 filed May 19, 2015. The entirety of all the above-listed applications are incorporated herein by reference.

TECHNICAL FIELD

Embodiments of the present invention relate to a toggle-type mold clamping apparatus and a molding apparatus such as an injection molding machine.

BACKGROUND ART

A toggle-type mold clamping apparatus is widely used in a molding apparatus, such as an injection molding machine. In a toggle-type mold clamping apparatus, a toggle link mechanism that generates a mold opening/closing force and a mold clamping force is provided between a pressure-receiving platen and a movable platen.

Among various molding methods using an injection molding machine, a foam molding method has recently attracted attention. The foam molding method can produce a molded resin product containing a myriad of air bubbles. Thus, the foam molding method can produce a light-weight molded product and, in addition, can impart heat insulating properties, sound absorbing properties, etc, to the molded product.

In foam molding, after clamping a mold, a molten resin containing a foaming agent is filled into a cavity of the mold. After a surface layer of the molten resin becomes solidified into a skin layer, it is necessary to slightly open the mold ("core-back" operation) and increase the volume of the cavity in order to foam the molten resin. In foam molding, the thickness and the foaming state of a molded product are determined by the degree of opening of the mold upon the slightly mold-opening operation. Therefore, the stopping accuracy of a movable platen upon the slightly mold-opening operation is a very important factor for ensuring the quality of the molded product.

The stopping accuracy of a movable platen upon the slightly mold-opening operation is of significance especially for a molding apparatus provided with a toggle-type mold clamping apparatus. This is because in a toggle-type mold clamping apparatus, a slight gap exists between a pin and a link connecting portion that connects links of a toggle link mechanism, and an error caused by the gap will decrease the stopping accuracy of a movable platen.

In order to enhance the stopping accuracy of a movable platen upon the slightly mold-opening operation, various improvements have been made in a toggle-type mold clamping apparatus.

For example, Japanese Patent Laid-Open Publication No. 2006-334793 has proposed a toggle-type mold clamping apparatus provided with a cavity expansion mechanism, disposed near a mold between a fixed platen and a movable platen, for pushing and moving the movable platen in conjunction with expansion of a cavity of the mold.

Japanese Patent Laid-Open Publication No. 2011-31535 describes a toggle-type mold clamping apparatus including a rotating platen disposed between a fixed platen and a movable platen. A mold having two types of product cavities of different shapes is mounted to the rotating platen. When opening the mold upon foam molding, the movable platen is pushed and moved in the mold opening direction by means of a drive mechanism which moves the rotating platen in mold opening/closing directions.

Japanese Patent Laid-Open Publication No. 2008-110498 discloses a toggle-type mold clamping apparatus including a movable platen consisting of a first movable platen to which a toggle mechanism is axially mounted, and a second movable platen to which a movable mold is mounted. A hydraulic cylinder and a position sensor are disposed between the first movable platen and the second movable platen.

SUMMARY OF THE INVENTION

In the toggle-type mold clamping apparatus disclosed in Japanese Patent Laid-Open Publication No. 2008-110498, a mold clamping force is exerted by the hydraulic cylinder directly on the mold from the back. Further, the distance between the first movable platen and the second movable platen is measured with the position sensor, and the measured distance is fed back to control the position of the movable platen. However, no regard is given to the influence of a gap between a pin and a link connecting portion of the toggle link mechanism on the core-back operation upon foam molding.

On the other hand, in the toggle-type mold clamping apparatuses disclosed in Japanese Patent Laid-Open Publication No. 2006-334793 and Japanese Patent Laid-Open Publication No. 2011-31535, the respective movable platens are pushed and moved in conjunction with the expansion of a mold cavity. This makes it possible to eliminate the influence of a slight gap between a pin and a link connecting portion.

However, the special cavity expansion mechanism or the drive mechanism for the movable platen, which is provided between the fixed platen and the movable platen in order to push and move the movable platen, makes it significantly difficult to perform work such as mold replacement.

The present invention has been made in view of the above problems in the prior art. It is therefore an object of the present invention to provide an opening/closing apparatus and a molding apparatus which can eliminate the influence of a slight gap formed between a bush and a pin in a link connecting portion of a toggle link mechanism and, in addition, can enhance workability e.g. in mold replacement.

In order to achieve the object, the present invention provides an opening/closing apparatus comprising: a fixed platen to which one of a pair of molds is to be mounted; a movable platen to which the other mold is to be mounted; a pressure-receiving platen connected to the fixed platen via tie bars; an opening/closing mechanism for opening/closing the molds by moving the movable platen back and forth, including a toggle link mechanism connecting the pressure-receiving platen and the movable platen; a first drive mechanism for driving the opening/closing mechanism; and a second drive mechanism for applying a load to the movable platen in a given direction in conjunction with the first drive mechanism.

The present invention also provides a molding apparatus comprising the above opening/closing apparatus.

BRIEF DESCRIPTION OF THE DRAWINGS

FIG. 3 is a plan view of the mold clamping apparatus (opening/closing apparatus) according to the embodiment of the present invention;

FIGS. 5(a) and 5(b) are diagrams illustrating a change in a gap in a link connecting portion as observed in the core-back operation upon foam molding when the core-back operation is performed without application of any load;

DESCRIPTION OF EMBODIMENTS

Embodiments of the mold clamping apparatus (opening/closing apparatus) and the molding apparatus according to the present invention will now be described with reference to the drawings.

First Embodiment

Figure 1:
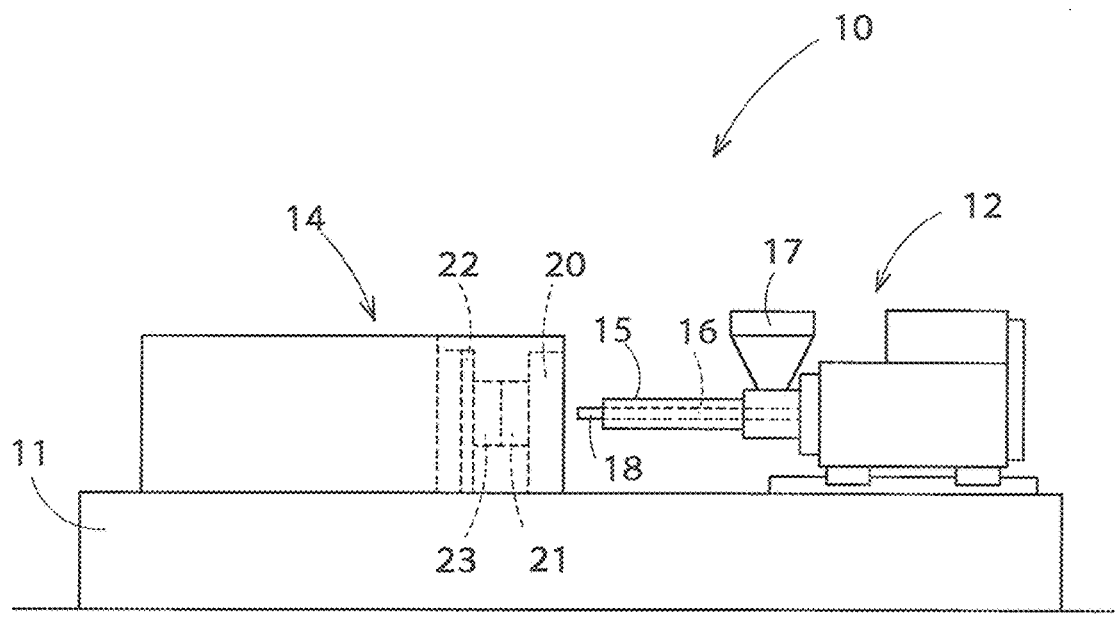
FIG. 1 is a side view schematically showing an injection molding machine including a mold clamping apparatus (opening/closing apparatus) according to the present invention.

FIG. 1 is a diagram schematically showing an injection molding machine (molding apparatus) 10 in which a mold clamping apparatus according to an embodiment of the present invention is applied. In FIG. 1, reference numeral 12 denotes the entire injection apparatus of the injection molding machine. Reference numeral 14 denotes the mold clamping apparatus (mold opening/closing apparatus, opening/closing apparatus) of the injection molding machine.

A screw 16 is rotatably and axially movably inserted into a barrel 15 of the injection molding machine 12. A resin (molding material, material) is fed from a hopper 17 into the barrel 15.

A not-shown heater for heating the resin is disposed around the barrel 15. In the injection molding machine 12, the screw 16 is rotated by a not-shown measuring motor to accumulate the resin in an anterior region in the barrel 15 while melting and kneading the resin and to thereby weigh the resin. The resin that has been accumulated in the anterior region in the barrel 15 is injected from a nozzle 18 into a cavity, formed by a fixed mold 21 and a movable mold 23, by advancing the screw 16 by means of an injection motor, a ball screw and a nut, all not shown.

The overall construction of the mold clamping apparatus 14 will now be described with reference to FIG. 2.

A fixed die plate (fixed platen) 20 is fixed at one end of a frame 11 of the mold clamping apparatus 14. A link housing (pressure-receiving platen) 24 is disposed at the other end of the frame 11. A movable die plate (movable platen) 22, located between the fixed die plate 20 and the link housing 24, is movably installed on the frame 11. The fixed mold (one mold, the other mold) 21 is mounted to the fixed die plate 20, while the movable mold (the other mold, one mold) 23 is mounted to the movable die plate 22. A cavity 25 is formed by the fixed mold 21 and the movable mold 23. The mold 19 thus consists of the fixed mold 21 and the movable mold 23.

The fixed die plate 20 and the link housing 24 are connected by a plurality of (e.g. four) tie bars 36. When closing the fixed mold 21 with the movable mold 23 and clamping the mold 19, the tie bars 36 are subjected to a mold clamping force exerted by the below-described toggle link mechanism (opening/closing mechanism, mold opening/closing mechanism, mold clamping mechanism) 28.

Figure 2:
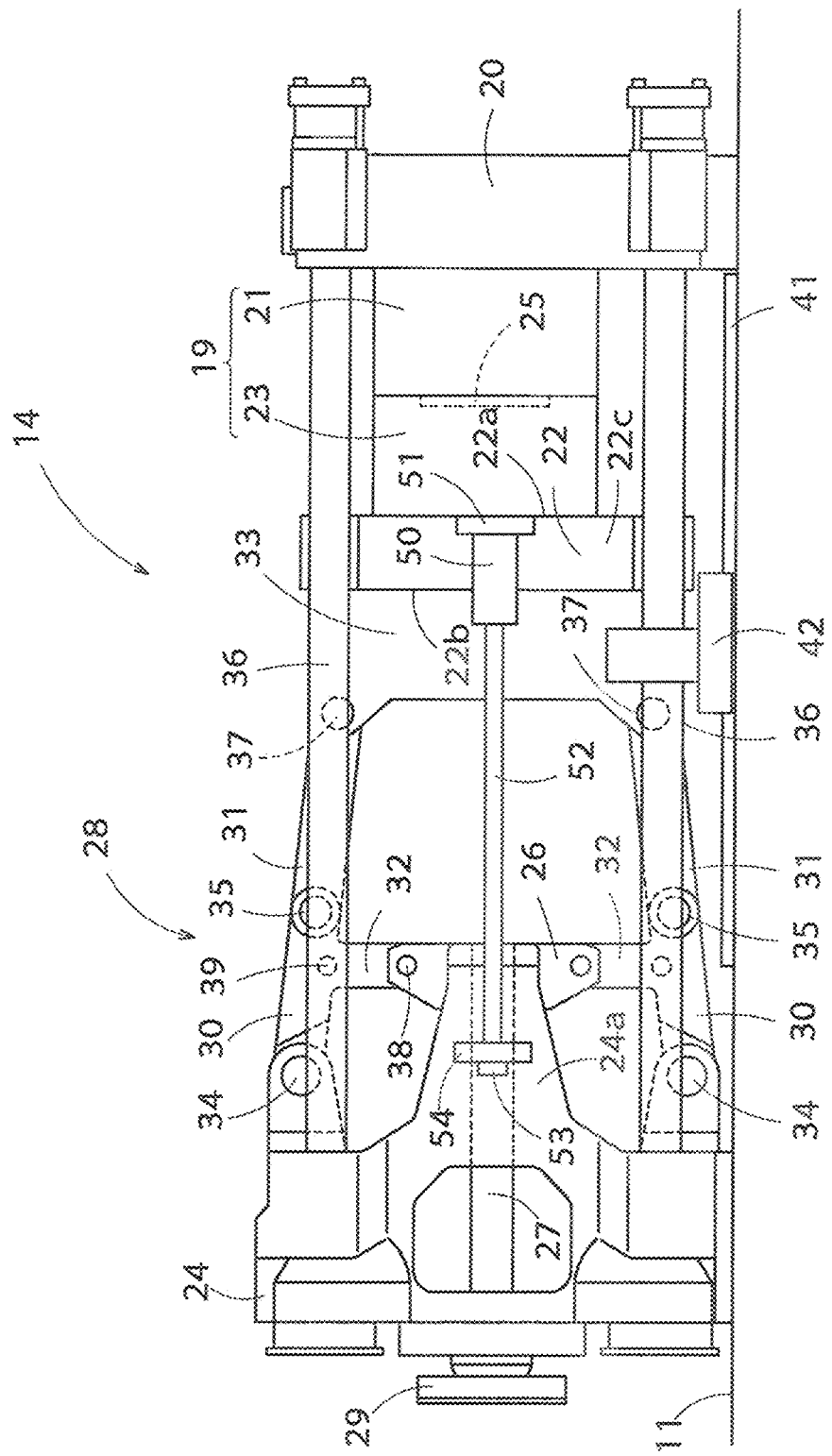
FIG. 2 is a side view of a mold clamping apparatus (opening/closing apparatus) according to an embodiment of the present invention.

As shown in FIG. 2, the toggle link mechanism 28 includes a pair of upper and lower toggle links, each including, for example, a pair of first links 30, a pair of second links 31 and a pair of third links 32. FIG. 3 shows the upper one of the pair of toggle links; the lower toggle link has the same construction.

As shown in FIG. 3, one-side ends of the pair of first links 30 are connected to the link housing 24 via a toggle pin 34. The other-side ends of the pair of first links 30 are connected to one-side ends of the pair of second links 31 via a toggle pin 35. The other-side ends of the pair of second links 31 are connected to a toggle link connecting portion 33 of the movable die plate 22 via a toggle pin 37.

In FIG. 2, reference numeral 26 denotes a crosshead connected to the toggle link mechanism 28.

One-side ends of the pair of third links 32 are connected to the crosshead 26 via a toggle pin 38. The other-side ends of the pair of third links 32 are connected to the pair of first links 30 via a toggle pin 39.

In this embodiment the link housing 24 is provided with a servo motor (drive) 40 as a drive source for the toggle link mechanism 28 (see FIG. 3). A not-shown nut portion of a ball screw mechanism, which converts rotation of the servo motor 40 into a linear movement and transmits the movement to the toggle link mechanism 28, is provided in the center of the crosshead 26. A ball screw 27 is configured to engage the nut portion. Rotation of the servo motor 40 is transmitted to the ball screw 27 via a timing belt 29. The servo motor 40 and the ball screw mechanism constitute a first drive mechanism for driving the toggle link mechanism 28.

Movement of the crosshead 26 in mold opening/closing directions is guided by a not-shown guide which is supported by arm portions 24a extending from the link housing 24 in the mold closing direction.

The first links 30 and the second links 31 of the toggle link mechanism 28, shown in FIG. 2, are in an extended state. As shown in FIG. 2, when the crosshead 26 moves rightward, the first links 30 and the second links 31 extend, thereby advancing the movable die plate 22 and closing the mold. A mold clamping force is generated by further closing the mold after contact of the movable mold 23 with the fixed mold 21.

On the other hand, when the crosshead 26 moves leftward in FIG. 2, the first links 30 and the second links 31 are bent by the third links 32, whereby the movable die plate 22 moves backward and opens the mold.

In order to guide the back-and-forth movement of the movable die plate 22 and to ensure the linearity of movement of the movable die plate 22, guide rails 41, extending parallel to the tie bars 36, are laid on both sides of the base 11. The movable die plate 22 is supported by linear guides 42 that slide on the guide rails 41.

When carrying out foam molding, in order to increase the volume of the cavity 25, the mold clamping apparatus 14 of this embodiment can perform the operation of slightly opening the mold (core-back operation, slightly mold-opening operation) after injecting a molten resin, containing a foaming agent, into the cavity 25.

In order to enhance the stopping accuracy of the movable die plate 22 upon the core-back operation, the movable die plate 22 is provided with the following core-back hydraulic cylinders which apply a load in a given direction to the movable die plate 22.

As shown in FIGS. 2 and 3, in this embodiment a pair of hydraulic cylinders 50 is provided as a core-back drive mechanism (second drive mechanism) between the link housing 24 and the movable die plate 22.

The cylinder body of each hydraulic cylinder 50 is, for example, secured to the side surface of the movable die plate 22 via a bracket 51. The movable die plate 22 has a surface 22a on which the movable mold 23 is mounted, the opposite surface 22b on the side of the toggle link mechanism 28, side surfaces 22c, etc. The brackets 51 are secured to the side surfaces 22c of the movable die plate 22 e.g. with bolts.

The piston rods 52 of the hydraulic cylinders 50 have a length long enough to reach the arm portions 24a of the link housing 24 even when the movable die plate 22 is in a mold-closed position. In this embodiment a connecting member 53 is provided at the front end of each piston rod 52, and the connecting member 53 is mounted to a fixing member 54 secured to the arm portion 24a of the link housing 24.

The action and the effect of the mold camping apparatus 14 of this embodiment, having the above-described construction, will now be described in terms of foam molding, in particular core-back injection foam molding.

In the mold clamping apparatus 14 of this embodiment, rotation of the servo motor 40 is converted by the ball screw 27 into a linear movement of the crosshead 26. The linear movement of the crosshead 26 extends/bends the toggle link mechanism 28, thereby moving back and forth the movable die plate 22. They constitute the first drive mechanism for driving the toggle link mechanism 28 and causing it to perform the operation of opening/closing the mold.

On the other hand, the hydraulic cylinders 50, provided between the link housing 24 and the movable die plate 22, constitute the second drive mechanism for applying a load to the movable die plate 22 e.g. upon the core-back operation during foam molding.

Figure 4A:
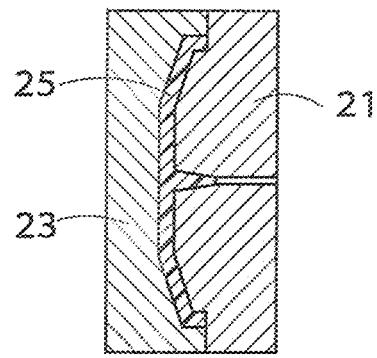
FIGS. 4(a) through 4(c) are diagrams illustrating a foam molding process.
Figure 4B:
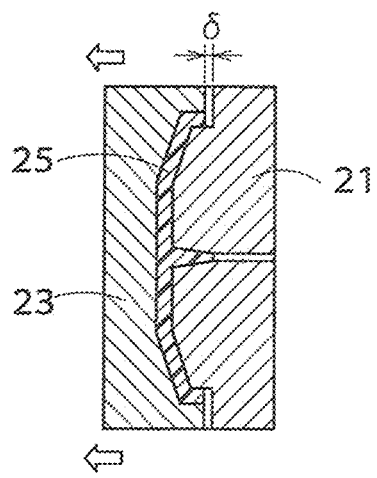
Figure 4C:
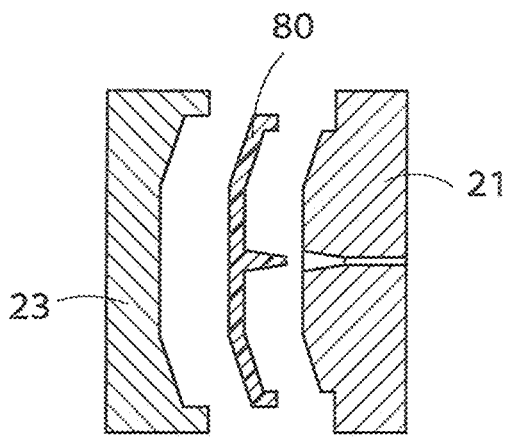

FIGS. 4(a) through 4(c) are diagrams illustrating a core-back injection foam molding process. When carrying out foam molding, after clamping of the mold, a molten resin containing a foaming agent is filled into the cavity 25 formed by the fixed mold 21 and the movable mold 23, and a surface layer of the molten resin is solidified to form a skin layer (FIG. 4(a)).

Thereafter, the mold clamping apparatus 14 performs the core-back operation, i.e. the operation of slightly opening the movable mold 23 by a predetermined movement distance δ, to increase the volume of the cavity 25, thereby foaming the resin (FIG. 4(b)). After the foaming, the resin is cooled, and then the movable mold 23 is moved backward to open the mold, and a molded product 80 is taken out (FIG. 4(c)).

FIGS. 5(a) and 5(b) are diagrams illustrating the state of a gap in a link connecting portion (link pin portion) of the toggle link mechanism 28 as observed upon the core-back operation after clamping of the mold. FIGS. 5(a) and 5(b) illustrate a gap between a toggle pin 37, which connects the second link 31 to the movable die plate 22, and the inner peripheral surface of a pin bush 60. The same or similar gap is formed in the other link connecting portions.

As shown in FIG. 5(a), upon clamping of the mold, the second link 31 of the toggle link mechanism 28 pushes the toggle pin 37 in the mold closing direction A, and therefore the pin bush 60 which is integrated with the second link 31 is pressed against the mold opening direction-side peripheral surface of the toggle pin 37. Accordingly, a very slight gap is formed between the mold closing direction-side inner surface of the pin bush 60 and the toggle pin 37. The gap is overdrawn in FIG. 5(a).

On the other hand, as shown in FIG. 5(b), the second link 31 of the toggle link mechanism 28 pulls the toggle pin 37 in the mold opening direction B upon the core-back operation. Accordingly, contrary to the situation upon clamping of the mold, the pin bush 60 is pressed against the mold closing direction-side peripheral surface of the toggle pin 37.

Thus, though the second link 31 actually moves a minute distance ε, corresponding to the gap, along with the bending of the toggle link mechanism 28 upon the core-back operation after the completion of clamping of the mold, the movable die plate 22 makes no movement. The same holds for the other link connecting portions of the toggle link mechanism 28. Such a relative movement between a toggle pin and a pin bush in each of the link connecting portions leads to an error in the stopping accuracy of the movable die plate 22, thereby making it impossible to accurately open the movable mold 23 by a predetermined movement distance δ (see FIG. 4(b)).

In view of this, in this embodiment the hydraulic cylinders 50, constituting the second drive mechanism, are operated in conjunction with the servo motor 40 of the first drive mechanism as follows.

First, referring to FIG. 3, a pressure oil is supplied into the cylinder chambers 50a of the hydraulic cylinders 50 to generate a force that acts on the piston rods 52 of the hydraulic cylinders 50 in the rod pull-in direction. The front ends of the piston rods 52 are coupled to the fixing members 54 of the link housing 24, and the link housing 24 is supported. Accordingly, the reaction force of the rod pull-in force of the hydraulic cylinders 50 acts on the movable die plate 22 in the mold opening direction.

While thus applying a load to the movable die plate 22 in the mold opening direction by means of the hydraulic cylinders 50, the core-back operation is started by activating the servo motor 40 to bend the toggle link mechanism 28.

Figure 6A:
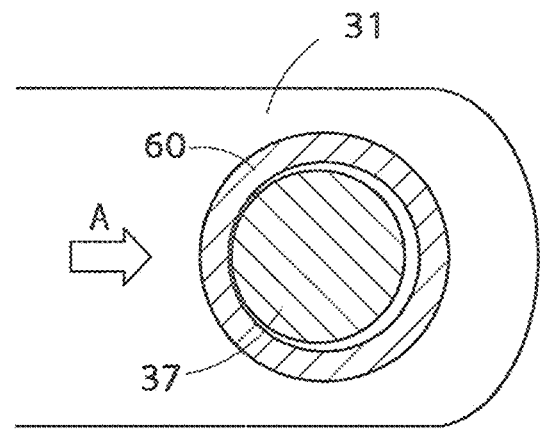
FIGS. 6(a) through 6(c) are diagrams illustrating a change in a gap in a link connecting portion as observed in the core-back operation upon foam molding when the core-back operation is performed while applying a load in the mold opening direction.
Figure 6B:
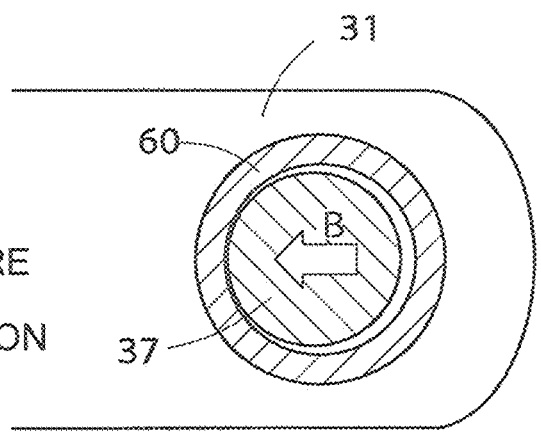
Figure 6C:
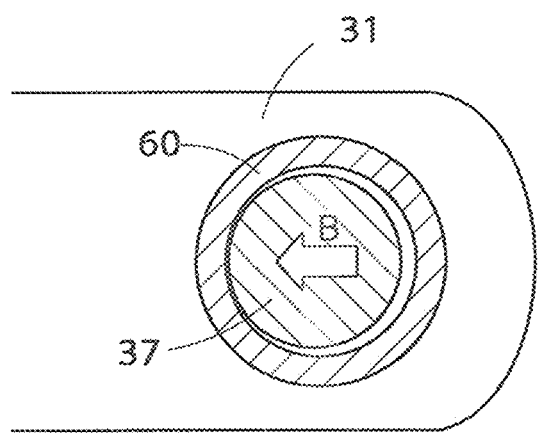

FIGS. 6(a) through 6(c) are diagrams illustrating the state of a gap in a link connecting portion (link pin portion) of the toggle link mechanism 28 as observed upon the core-back operation after clamping of the mold when the core-back operation is performed while applying a load to the movable die plate 22 in the mold opening direction by means of the hydraulic cylinders 50. FIGS. 6(a) through 6(c) illustrate a gap between a toggle pin 37, which connects the second link 31 to the movable die plate 22, and the inner peripheral surface of a pin bush 60. The same or similar gap is formed in the other link connecting portions.

As shown in FIG. 6(a), upon clamping of the mold, the second link 31 of the toggle link mechanism 28 pushes the toggle pin 37 in the mold closing direction A, and therefore the pin bush 60 is pressed against the mold opening direction-side peripheral surface of the toggle pin 37. Accordingly, a very slight gap is formed between the mold closing direction-side inner surface of the pin bush 60 and the toggle pin 37.

When a load is applied to the movable die plate 22 in the mold opening direction B by means of the hydraulic cylinders 50, the toggle pin 37 is still pressed against the mold opening direction-side inner surface of the pin bush 60 at a time immediately before the start of the core-back operation as shown in FIG. 6(b).

By thus starting the core-back operation while keeping the hydraulic cylinders 50 attracting the movable die plate 22 in the mold opening direction B, the toggle link mechanism 28 can move the movable die plate 22 in the mold opening direction while keeping the gap in the link connecting portion in the state shown in FIG. 6(c), i.e. in the same state as that immediately before the start of the core-back operation.

As described above, the hydraulic cylinders 50 keep attracting the movable die plate 22 in the mold opening direction upon the core-back operation performed after filling a molten resin into the cavity 25 in the mold. This makes it possible not to cause a change in the state of a gap in each link connecting portion after the start of the core-back operation. Thus, it becomes possible to eliminate an error caused by a gap in each link connecting portion of the toggle link mechanism 28 and enhance the stopping accuracy of the movable die plate 22. Accordingly, the movable die plate 22 can be moved by a movement distance which is necessary for slight opening of the mold, and can be stopped precisely at a predetermined position. Since the mold can thus be slightly opened with accuracy, it becomes possible to mold a high-quality molded resin foam product.

The hydraulic cylinders 50, constituting the second drive mechanism, are provided between the link housing 24 and the movable die plate 22. Therefore, the hydraulic cylinders 50 do not obstruct work such as mold replacement. Thus, the workability of mold replacement can be enhanced.

Though in the above-described embodiment the hydraulic cylinders 50 apply a load to the movable die plate 22 in the mold opening direction B, the hydraulic cylinders 50 may apply a load to the movable die plate 22 in the mold closing direction A. The same effect can be achieved also by the application of such an opposite-direction load to the movable die plate 22 if the driving force of the second drive mechanism is controlled such that it is lower than the driving force of the first drive mechanism.

Figure 7:
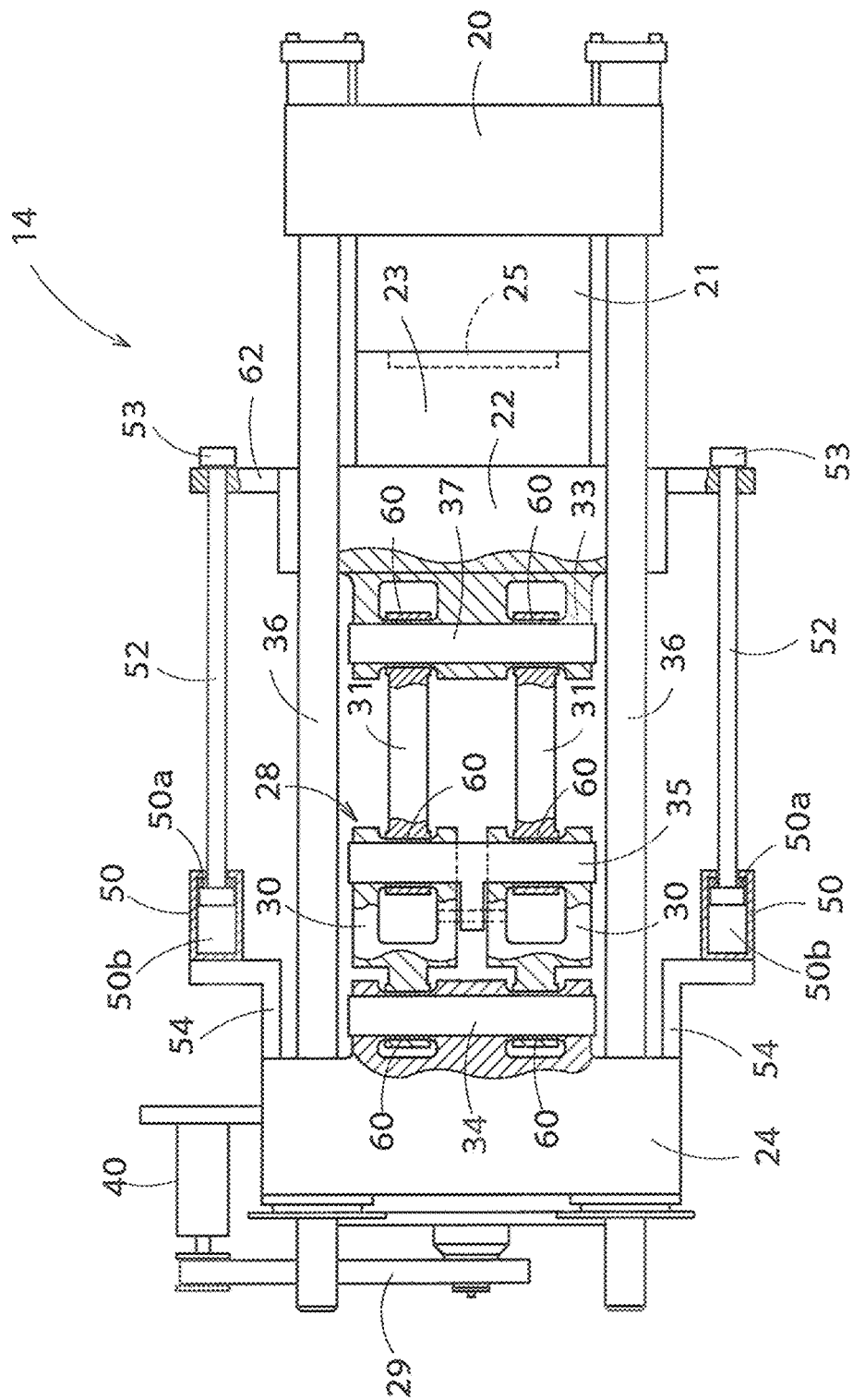
FIG. 7 is a plan view of a mold clamping apparatus (opening/closing apparatus) according to a variation of the embodiment of the present invention.

FIG. 7 shows a variation in which the hydraulic cylinders 50 are mounted inversely. In particular, in this embodiment the cylinder body of each hydraulic cylinder 50 is mounted to the fixing member 54 secured to the link housing 24, while the front end of the piston rod 52 is connected via the connecting member 53 to a bracket 62 provided on the movable die plate 22. Such disposition of the hydraulic cylinders 50 can achieve the same effect as that achieved by the hydraulic cylinders 50 of FIG. 3.

Though in the above-described embodiments the hydraulic cylinders 50 are connected to the fixing members 54 in order to facilitate connection of the hydraulic cylinders 50 to the link housing 24, the hydraulic cylinders 50 may be connected directly to the link housing 24.

Second Embodiment

Figure 8:
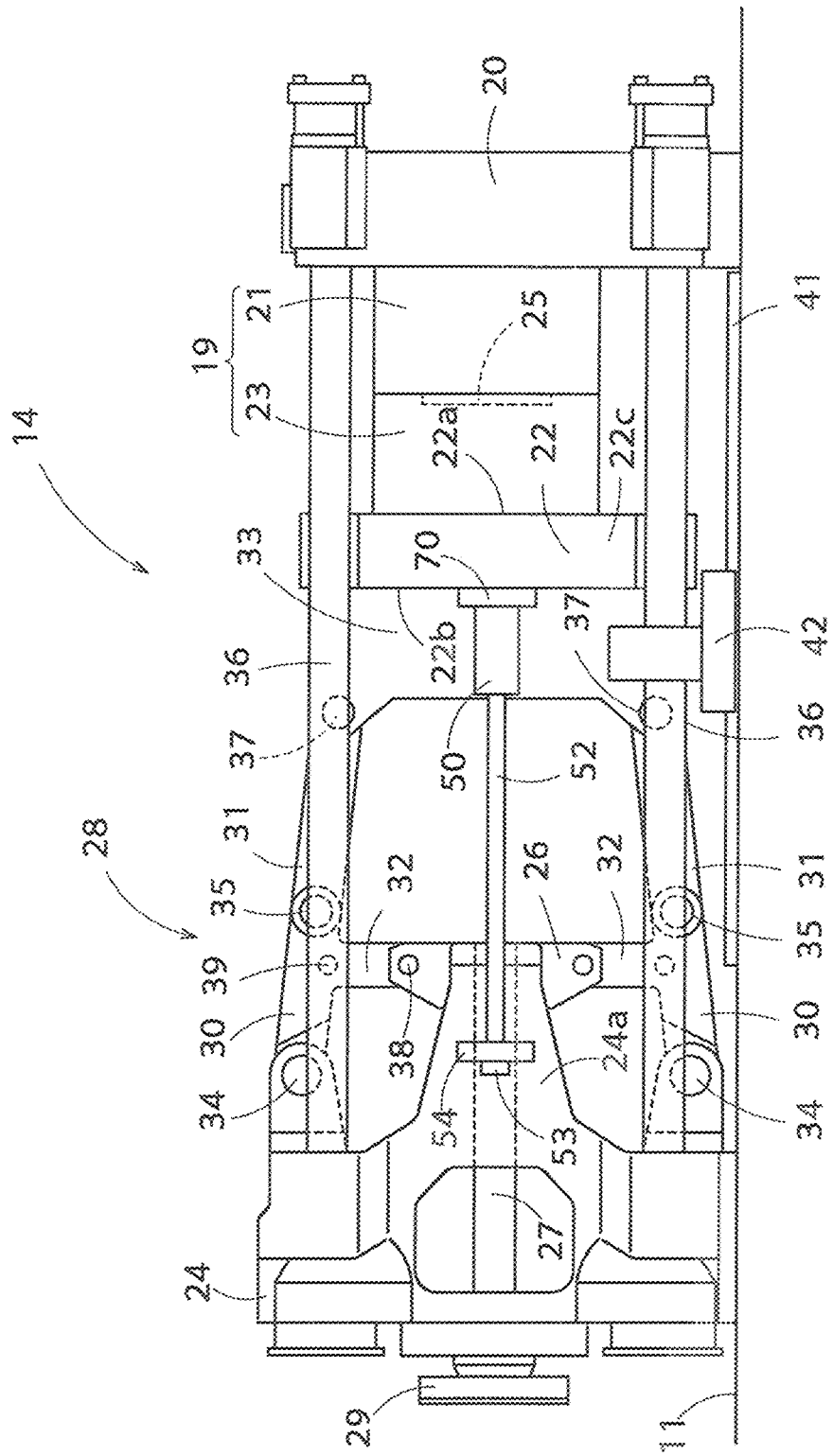
FIG. 8 is a side view of a mold clamping apparatus (opening/closing apparatus) according to another embodiment of the present invention.
Figure 9:
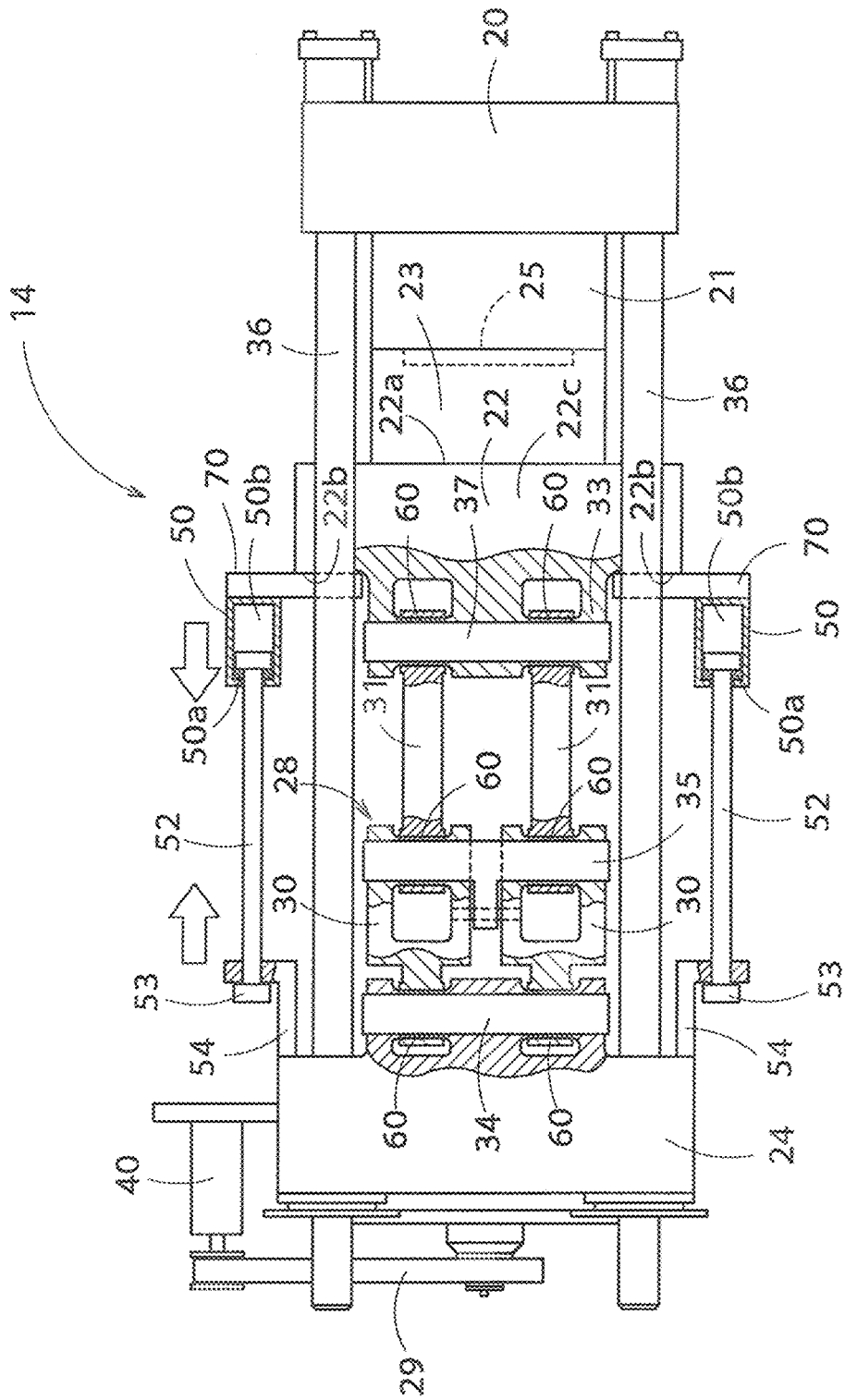
FIG. 9 is a plan view of the mold clamping apparatus (opening/closing apparatus) according to the another embodiment of the present invention.

FIGS. 8 and 9 show a mold clamping apparatus (opening/closing apparatus) according to a second embodiment of the present invention. The same reference numerals as used for the mold clamping apparatus of the first embodiment, shown in FIGS. 2 and 3, are used to refer to the same components, and a detailed description thereof is omitted.

In the mold clamping apparatus according to the second embodiment, the disposition of the hydraulic cylinders 50 as a core-back drive mechanism (second drive mechanism) differs from that of the first embodiment shown in FIGS. 2 and 3.

In the first embodiment, the hydraulic cylinders 50 are disposed on the side surfaces 22c of the movable die plate 22 via the brackets 51. In the second embodiment, on the other hand, brackets 70 are mounted, e.g. with bolts, on the toggle link mechanism 28-side surface 22b of the movable die plate 22, i.e. the opposite surface from the mold mounting surface 22a, and the hydraulic cylinders 50 are secured to the brackets 70.

As shown in FIG. 3, in the case of the first embodiment, the brackets 51 are provided in positions near the mold mounting surface 22a of the movable die plate 22. Therefore, when the hydraulic cylinders 50 attract the movable die plate 22 in the mold opening direction, the points of application of the force lie near the mold mounting surface 22a of the movable die plate 22. This can curve or locally deform the mold mounting surface 22a which should be a flat surface. Such a deformation of the mold mounting surface 22a, even when it is very small, could adversely affect the accuracy of clamping of the mold or the accuracy of slightly opening the mold upon the core-back operation.

On the other hand, in the case of the second embodiment in which the hydraulic cylinders 50 are disposed on the opposite surface 22b from the mold mounting surface 22a, the points of application of the force that attracts the movable die plate 22 in the mold opening direction lie farther away from the mold mounting surface 22a. This makes it possible to prevent deformation of the mold mounting surface 22a and maintain the accuracy of mold clamping and the accuracy of slightly opening the mold.

As with the first embodiment, the second embodiment achieves the effect of eliminating an error caused by a gap in each link connecting portion of the toggle link mechanism 28 and enhancing the stopping accuracy of the movable die plate 22, thus making it possible to slightly open the mold with accuracy.

Though in the above-described embodiments the hydraulic cylinders 50 are used as the second drive mechanism, the present invention is not limited thereto. For example, pneumatic cylinders may be used instead of the hydraulic cylinders 50. Instead of such a fluid-pressure cylinder, it is also possible to use an electrically-driven ball screw and a nut (electromotive drive mechanism).

Though in the above-described embodiments the present invention is applied in an injection molding machine, the present invention is not limited thereto.

Thus, the present invention can also be applied in other molding apparatuses such as a die-cast machine.

The invention claimed is:

1. An opening/closing apparatus comprising:
a fixed platen to which one of a pair of molds is to be mounted;
a movable platen to which the other mold is to be mounted;
a pressure-receiving platen connected to the fixed platen via tie bars;
an opening/closing mechanism that opens and closes the molds by moving the movable platen back and forth, including a toggle link mechanism connecting the pressure-receiving platen and the movable platen, the toggle link mechanism including a link housing;
a drive mechanism that drives the opening/closing mechanism; and
at least one core-back hydraulic cylinder that applies a load to the movable platen in a given direction in conjunction with the drive mechanism, wherein the at least one core-back hydraulic cylinder is located between the link housing and the movable platen, connecting the movable platen with the pressure-receiving platen, and the load applied by the at least one core-back hydraulic cylinder to the movable platen is in such a direction as to eliminate a gap between a pin and a bush in a link connecting portion of the toggle link mechanism.

2. The opening/closing apparatus according to claim 1, wherein when opening the molds, the at least one core-back hydraulic cylinder applies the load to the movable platen in a mold opening direction.

3. The opening/closing apparatus according to claim 1, wherein:
the drive mechanism includes a first drive mechanism and a second drive mechanism; and
when opening the molds, a driving force of the at least one core-back hydraulic cylinder is controlled such that the driving force is lower than a driving force of the first drive mechanism while the second drive mechanism is applying the load to the movable platen in a mold closing direction.

4. The opening/closing apparatus according to claim 1, wherein the at least one core-back hydraulic cylinder is additionally applying a load to the movable platen in order to perform a core-back operation of opening the molds to increase the volume of a cavity, formed in the molds, after filling a molten resin containing a foaming agent into the cavity.

5. The opening/closing apparatus according to claim 1, wherein the at least one core-back hydraulic cylinder comprises at least one fluid-pressure cylinder having a cylinder body, at one end, is connected to the movable platen and, at the other end, is connected to the pressure-receiving platen or to a fixing member secured to the pressure-receiving platen so as to exert the load thereon exclusively in the opening direction.

6. The opening/closing apparatus according to claim 5, wherein the at least one core-back hydraulic cylinder consists of a pair of cylinders whose cylinder bodies are mounted on the pressure-receiving platen.

7. The opening/closing apparatus according to claim 5, wherein the at least one fluid-pressure cylinder consists of a pair of cylinders whose cylinder bodies are mounted on an opposite surface from a mold mounting surface of the movable platen.

8. The opening/closing apparatus according to claim 1, wherein the opening/closing apparatus is a mold clamping apparatus provided in an injection molding machine for performing core-back injection foam molding.

9. A molding apparatus comprising the opening/closing apparatus according to claim 1.

10. The opening/closing apparatus according to claim 2, wherein the at least one core-back hydraulic cylinder comprises at least one fluid-pressure cylinder having a cylinder body, at one end, is connected to the movable platen and, at the other end, is connected to the pressure-receiving platen or to a fixing member secured to the pressure-receiving platen so as to exert the load thereon exclusively in the opening direction.

11. The opening/closing apparatus according to claim 3, wherein the at least one core-back hydraulic cylinder comprises at least one fluid-pressure cylinder having a cylinder body, at one end, is connected to the movable platen and, at the other end, is connected to the pressure-receiving platen or to a fixing member secured to the pressure-receiving platen so as to exert the load thereon exclusively in the opening direction.

12. The opening/closing apparatus according to claim 4, wherein the at least one core-back hydraulic cylinder comprises at least one fluid-pressure cylinder having a cylinder body, at one end, is connected to the movable platen and, at the other end, is connected to the pressure-receiving platen or to a fixing member secured to the pressure-receiving platen so as to exert the load thereon exclusively in the opening direction.

13. The opening/closing apparatus according to claim 2, wherein the opening/closing apparatus is a mold clamping apparatus provided in an injection molding machine for performing core-back injection foam molding.

14. The opening/closing apparatus according to claim 3, wherein the opening/closing apparatus is a mold clamping apparatus provided in an injection molding machine for performing core-back injection foam molding.

15. A molding apparatus comprising the opening/closing apparatus according to claim 2.

16. A molding apparatus comprising the opening/closing apparatus according to claim 3.

* * * * *

UNITED STATES PATENT AND TRADEMARK OFFICE
CERTIFICATE OF CORRECTION

PATENT NO. : 10,105,753 B2
APPLICATION NO. : 15/522620
DATED : October 23, 2018
INVENTOR(S) : Takaki Miyauchi It is certified that error appears in the above-identified patent and that said Letters Patent is hereby corrected as shown below:

On the Title Page

Please add under:
(30) Foreign Application Priority Data:
"October 28, 2014 (JP) .........2014-210291"

Signed and Sealed this
Ninth Day of April, 2019

Andrei Iancu
*Director of the United States Patent and Trademark Office*